United States Patent Office 3,346,965
Patented Oct. 17, 1967

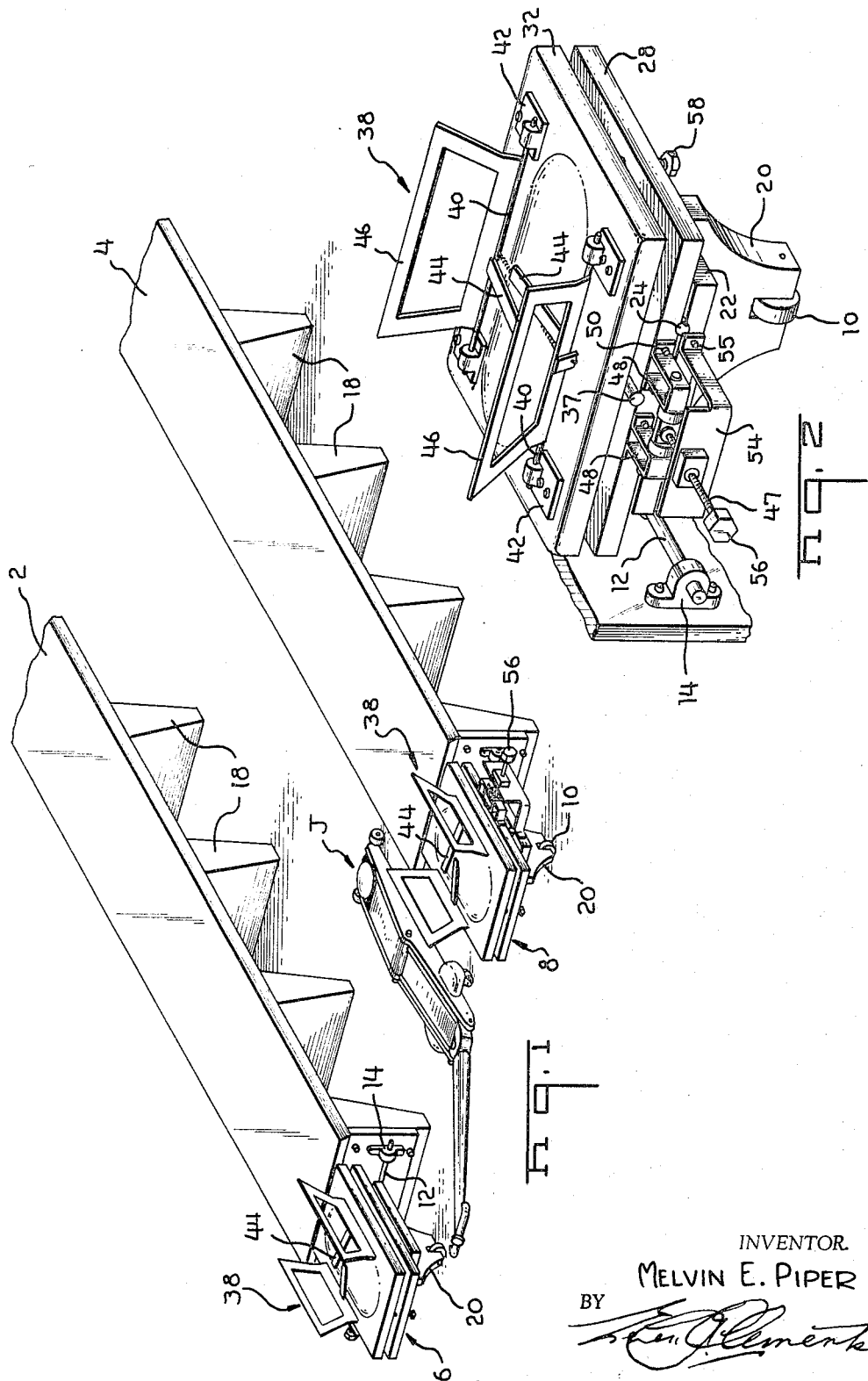

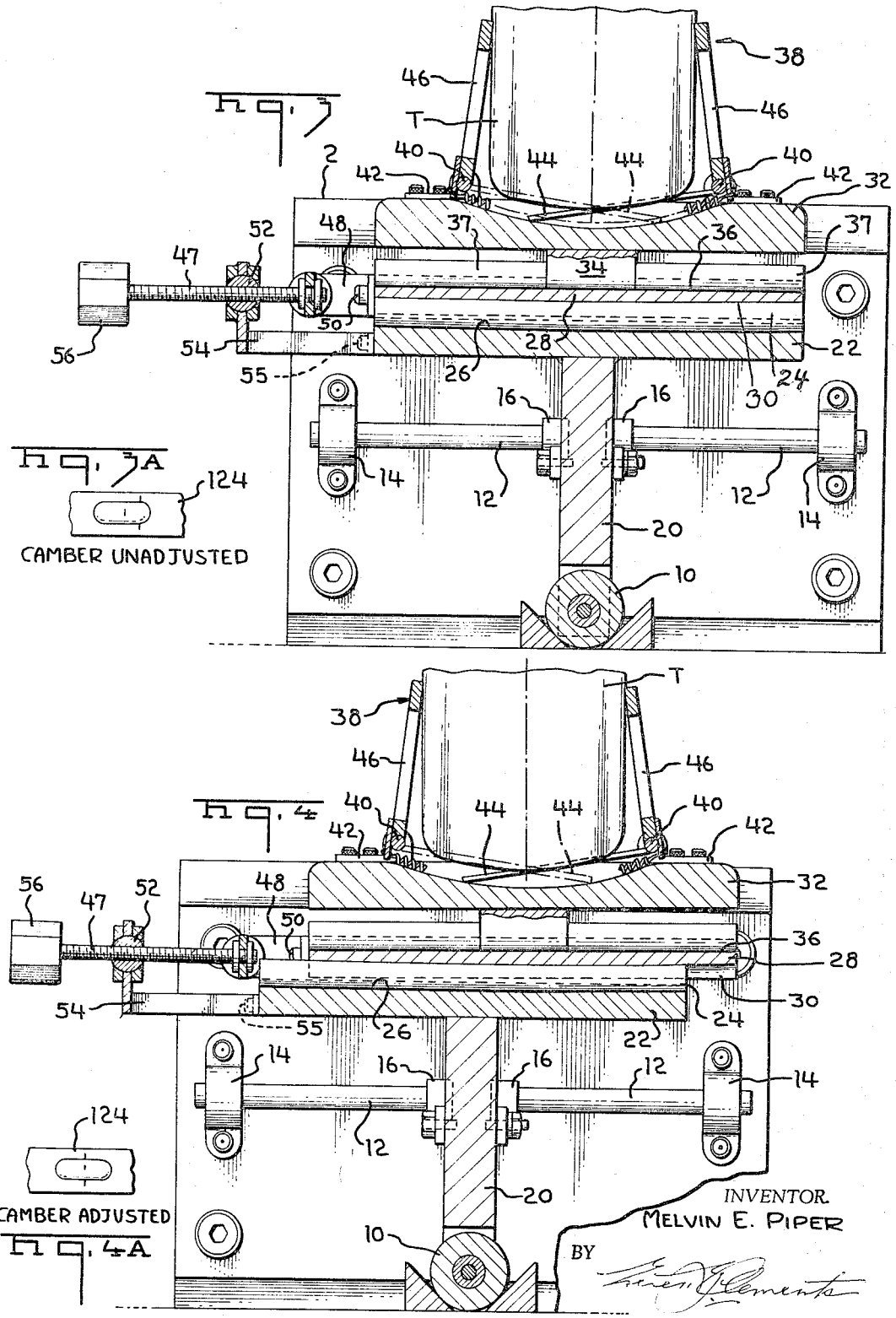

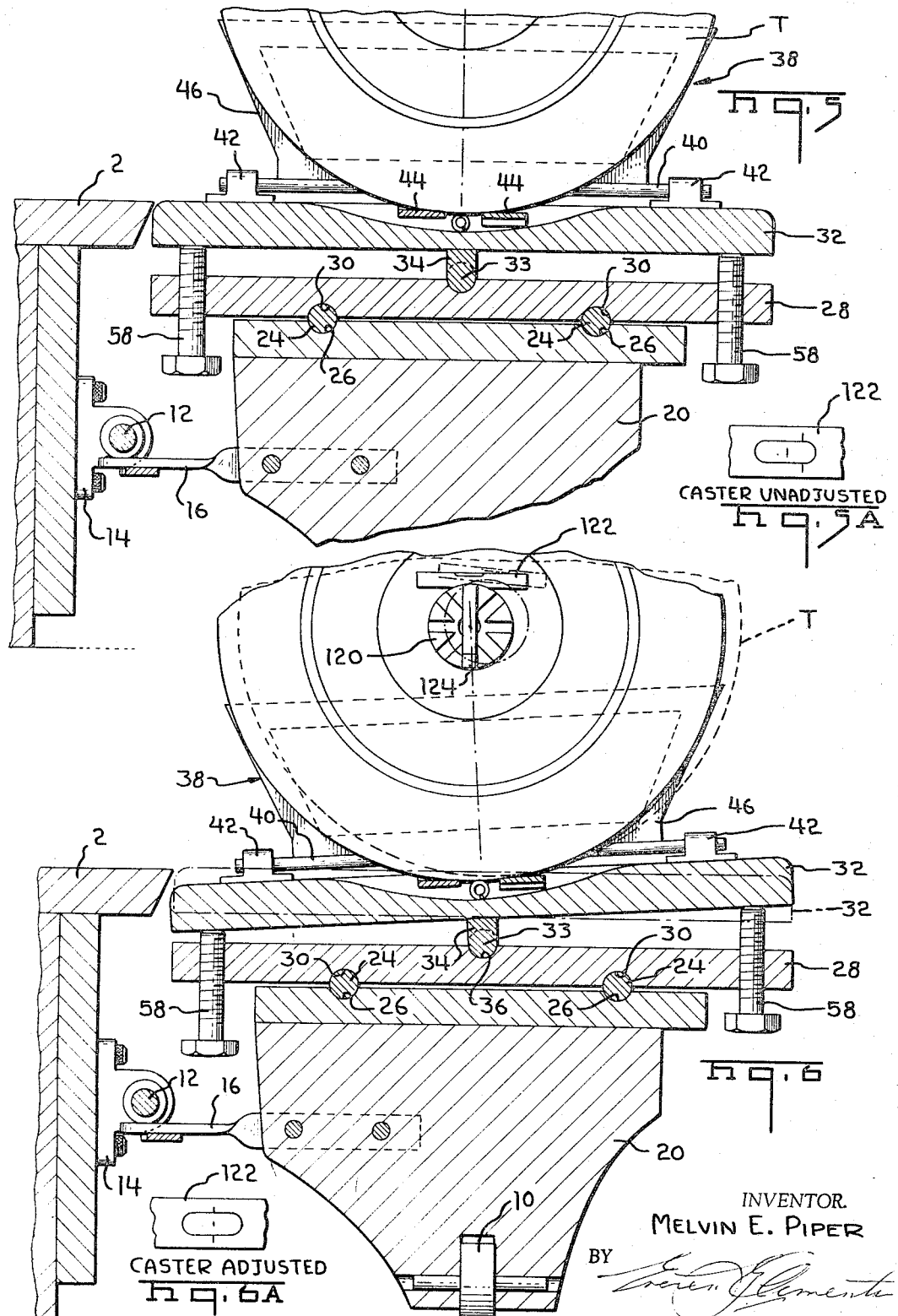

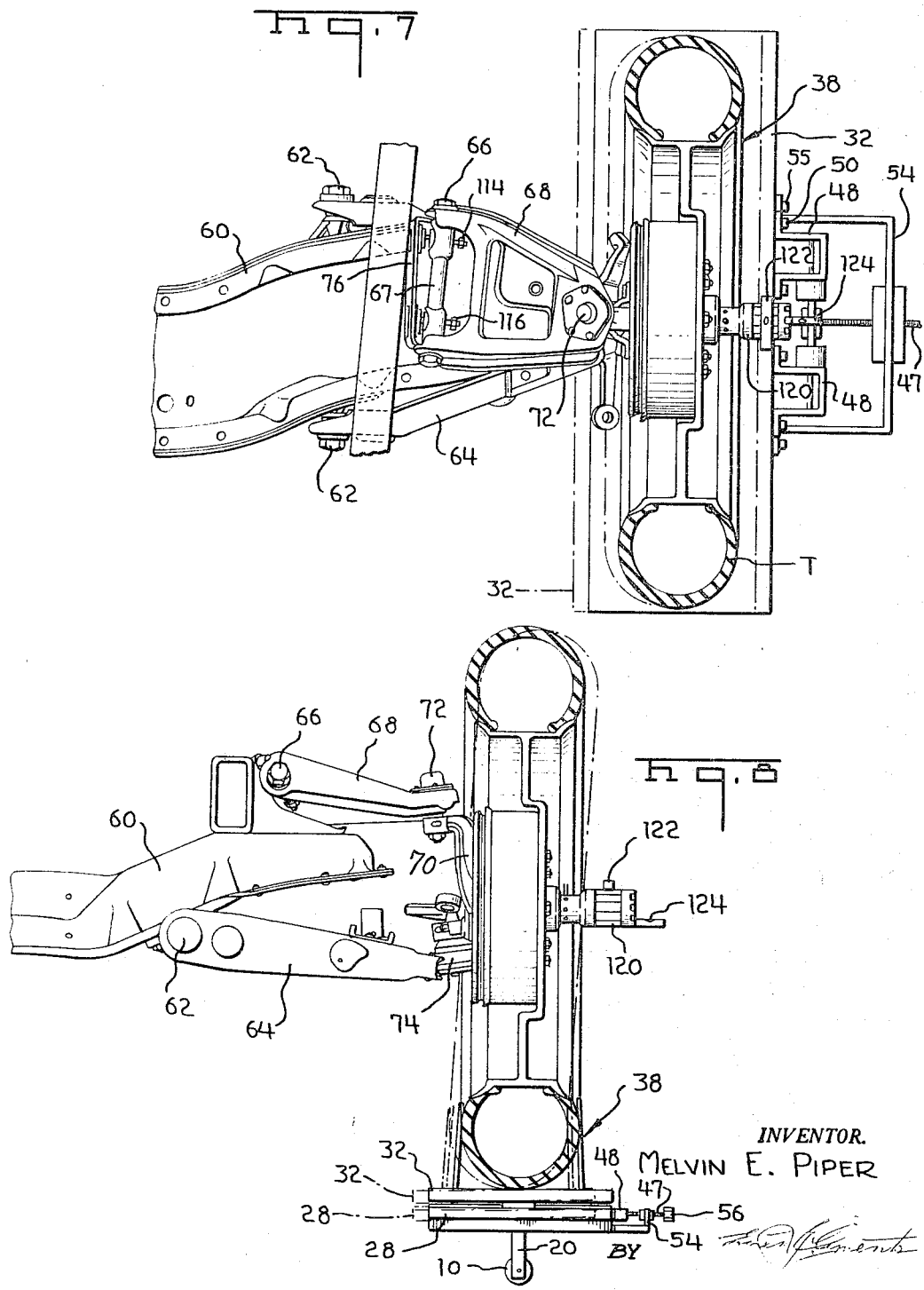

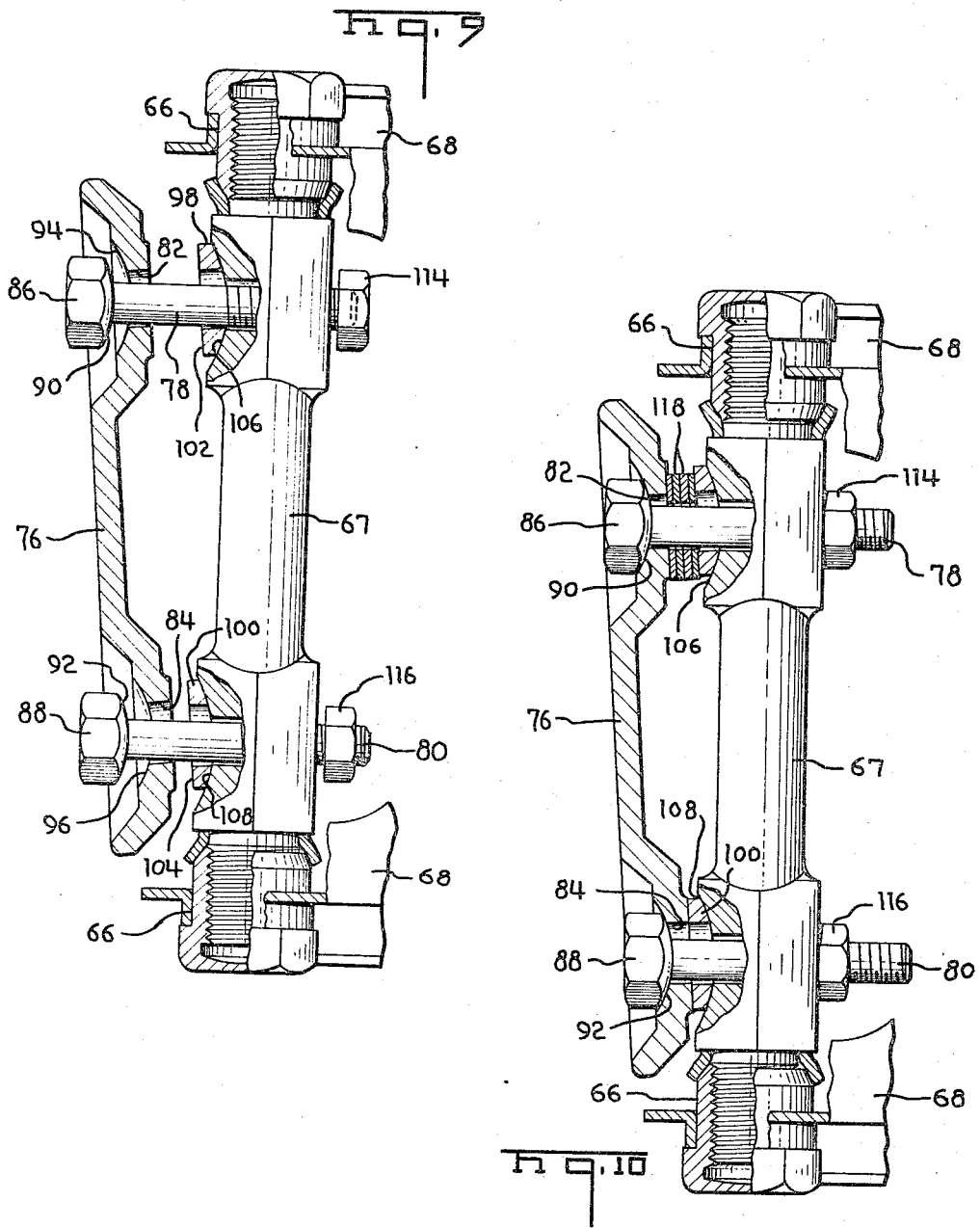

3,346,965
METHOD AND APPARATUS FOR ALIGNING THE FRONT WHEELS OF AN AUTOMOBILE
Melvin E. Piper, 2324 Union Ave., Altoona, Pa. 16602
Filed June 26, 1964, Ser. No. 378,270
8 Claims. (Cl. 33—203.14)

This invention relates to a method and apparatus for aligning the front wheels of an automobile.

The usual method for obtaining the proper caster and camber adjustment for the front wheels is to make a first measurement to determine the amount the wheel is out of proper adjustment and to then make an initial adjustment after estimating the amount of misalignment and adjustment necessary to bring the wheel into correct or proper alignment. After the initial adjustment is made a second measurement is then necessary and made and after that second estimate a second adjustment is made. The process of measuring and adjusting by thus estimating is continued until the wheel is adjusted to an acceptable level of tolerance. As can be seen, such hit and miss methods are very time consuming and the final alignment may be anywhere in the range of acceptable tolerance.

It is an object of this invention therefore to provide a method for aligning the front wheels of an automobile that eliminates such a hit and miss procedure and in which the final adjustment is at or very close to the center of the tolerance range.

It is a further object of this invention to provide an apparatus by which the method can be easily performed.

The method comprises essentially the steps of first gripping the wheel to be aligned at its base, then loosening the adjusting mechanism of the wheel pivoting and supportnig means to allow the wheel to be moved by a manual adjusting of the gripping mechanism into the proper position of wheel alignment, preferably in the center of the tolerance range, and then tightening the said adjusting mechanism.

The apparatus for carrying out the method comprises an adjustable wheel base gripping means for firmly supporting and holding the wheel at its base while pivotally positioning said wheel thereabove and thereafter employing adjustment means for moving the wheel gripping and holding mechanism and thus moving the supported wheel into the exact shifted and/or rocked position for correct alignment.

An understanding of the invention above described can be had by a more careful reading of the following description in conjunction with the accompanying drawing wherein:

FIG. 1 is a view showing the general layout of the invention in combination with a ramp onto which an automobile is driven;

FIG. 2 is a perspective view of an automobile front wheel clamping and base holding mechanism or carrier;

FIG. 3 is a front view showing a wheel supported upon and automatically engaged by the adjustable tire and/or wheel gripping mechanism of the carrier;

FIG. 3A is a view of a bubble indicator showing at the initial gripping condition of FIG. 3 the amount the wheel is out of proper camber position;

FIG. 4 is a view similar to FIG. 3 but showing the parts moved to carry therewith the auto wheel into a second position or corrected angle for camber adjustment;

FIG. 4A is a view of the bubble indicator when the wheel is adjusted to the position of FIG. 4, showing the corrected camber reading to the center of the tolerance range;

FIG. 5 is a view taken at right angles to FIG. 3 with an automobile wheel on the support adjustment means and showing the amount the wheel is out of proper caster position;

FIG. 5A is a view of a bubble indicator connected with the supported wheel to show the amount the wheel is initially out of proper caster position;

FIG. 6 is a view similar to FIG. 5 showing the wheel clamping and supporting parts moved into a second and/or caster corrected position;

FIG. 6A is a view of the associated bubble indicator showing the desired caster adjustment in the center of the tolerance range;

FIG. 7 is a top view of an automobile front wheel suspension showing the associated bubble indicators in position for adjustment;

FIG. 8 is an elevation of the front wheel suspension of FIG. 7, showing the mounting of the bubble indicators as in FIG. 7;

FIG. 9 is a view showing the pivoted upper wish bone or bifurcated bracket and its adjustable rock shaft with all shims removed so as to be loose and freely mounted to allow pivotal movement of the bracket relative to the vehicle frame; and FIG. 10 is a view showing the pivoted rock shaft with shims as secured in adjusted position.

In FIG. 1 is shown the alignment apparatus of this invention comprising spaced parallel ramps 2, 4 having mounted on the ends thereof wheel clamping and supporting carriers 6, 8. Each carrier is supported on a wheel 10 for rolling on a floor laterally of the said ramp and is slidably supported on the end of the ramp by a guide bar 12 secured to the ramp by brackets 14 and by guides 16, slidably mounted on the guide bar. The carriers can be moved manually laterally of the ramps to accommodate automobiles having different transverse spacing of front wheels. Although the ramps are shown as supported on a floor by standards 18 it is within the scope of the invention to use the floor as a ramp or track and to mount the carriers in a pit in the floor.

Each carrier comprises a supporting base 20 having rotatably mounted on one end the supporting wheel 10 and having secured thereto at the other end, as by welding or otherwise, a support 22. Upwardly curved rods 24 are secured in parallel grooves 26 in the support, as by welding, to provide a guide for a plate 28 having grooves 30 for slidable engagement with said rods. A base 32 is tiltably mounted at its center as at 33 on plate 28 to tilt about an axis perpendicular to the ramps (see FIG. 6). For this purpose the base is provided with a rocking support 34 having a semi-cylindrical bottom received in a shallow cylindrical groove 36 in the plate 28 and short cylindrical bars 37 are secured in groove 36 as by welding to prevent movement of the base support along the groove 36. A pair of gripping and clamping members 38 are pivotally mounted on the base 32 by rods 40 mounted in brackets 42 secured to the base. Each gripping and clamping member 38 comprises a bell crank lever wherein one arm 44 thereof, is pressed downwardly by the weight of a wheel to pivot the other arm 46 thereof, into engagement with the side of the wheel to tightly grip and hold the wheel under its weight for a purpose more fully explained below. The term "wheel" as here used is intended to include a wheel rim with a tire mounted thereon.

A screw 47 is rotatably connected to brackets 48 fixed to plate 28 as by threaded fasteners 50. A spherical nut element 52 is rockably mounted on a bracket 54 secured to support 22 as by threaded fasteners 55. Upon rotation of screw 47 as by means of a wrench gripping the screw head 56 the plate 28 is adjustably moved and guided laterally of the ramps on the curved guide rods 24 and grooves 30.

A pair of threaded members shown as bolts 58 are threaded in plate 28 and bear against the base 32. By backing off one bolt and taking up on the other the base 32 is adjustably tilted and rocked about the common axis 33 of the semi-cylindrical end of 34 and groove 36.

For purposes of explanation of the invention there is illustrated in FIGS. 7–10 a well known independent front wheel suspension having caster and camber adjusting means. Such a suspension is described in detail in Patent No. 2,978,253 and comprises a cross frame member 60 having pivotally connected thereto at 62 a lower bracket 64 and having also connected thereto at 66 an upper bifurcated bracket 68. A wheel supporting assembly 70 is connected to the upper and lower brackets by ball joint assemblies 72 and 74 respectively. The pivotal or rocking connection of the bracket 68 with the cross frame 60 is shown in detail in FIGS. 9 and 10 and comprises the bar 67 secured to a bracket 76 which is secured to the cross frame of the vehicle. The securing means comprises bolts 78, 80 fitted through openings 82, 84 in the anchor plate 76. The bolts are provided with head portions 86, 88 having convex surfaces 90, 92 for cooperation with the concave surfaces 94, 96 on the anchor plate 76. Washers 98, 100 are mounted on the bolts and are formed with a flat surface 102, 104 and a convex surface 106, 108 for cooperation with concave surfaces 110, 112 on pivot structure 67. The pivot structure is secured in position by tightening nuts 114, 116 to clamp the washers 98, 100 and the necessary shims 118 along with the pivot structure against anchor plate 76 as shown in FIG. 10.

In aligning the front wheels of an automobile the vehicle is driven onto the tracks 2 and 4 with the front wheels adjacent the carriers 6, 8. The carriers are adjusted laterally to the width of the wheels and the vehicle is moved onto the carriers. The weight of the wheels on the arms 44 pivots arms 46 toward each other to grip the wheels. A lifting jack J is then moved under the front end of the vehicle and is raised into contact therewith to support the weight thereof when the mechanism holding the front wheels to the vehicle is loosened. With the vehicle positioned on the carriers and the jack J (see FIG. 1) in contact with the underside of the front end a gauge nut 120 such as disclosed in U.S. patent application Ser. No. 365,738, filed May 7, 1964, is secured to the axle and a level bubble mechanism 122 is magnetically attached on the nut and a second level bubble mechanism 124 is similarly mounted on the end of said nut as fully explained in said aforementioned application. The bubble mechanism 122 indicates the caster of the wheel and the bubble mechanism 124 indicates the camber. If the indicators show that the caster and/or camber require adjustment, as by the positions of the bubbles illustrated in FIGS. 3A and 5A, nuts 114, 116 are loosened and shims 118 removed. The pivoting structure 67 is then free to assume the position shown in FIG. 9 but is prevented from doing so by the gripping mechanism 38. By rotating screw 47 the plate 28 is moved laterally of the plane of the wheel to pivot the wheel about the ball joint 74. This movement is continued till the bubble is centered as shown in FIG. 4A to indicate that the wheel is in the correct camber position. The movement is illustrated in FIG. 8 where the wheel is pivoted about the ball joint 74 from the solid line position to the dotted line position as the plate 28 is moved and the proper camber position is indicated when the bubble is centered.

The proper caster position is obtained by adjusting bolts 58 to tilt the base 32 along with the gripping mechanism and the wheel gripped thereby till the bubble is centered as shown in FIG. 6A. This is illustrated in FIG. 6 where the pivoting takes place about the ball joint 74 from the solid line position to the dotted line position.

When the proper caster and camber positions have been obtained as indicated by the centering of the bubbles, the pivot 67 will also be in the proper position and it is then merely necessary to supply whatever shims 118 are needed and to tighten the nuts to thereby retain the pivot in final adjusted position.

I claim:
1. An alignment device for the front wheels of an automobile comprising spaced parallel tracks, a carrier at the end of each track, means mounting each carrier for adjustment laterally of the tracks to accommodate the front wheels, a base mounted on each carrier gripping means mounted on each base for gripping a wheel, and means for adjusting each base transversely of the tracks independently of the carrier.

2. An alignment device for the front wheels of an automobile comprising spaced parallel tracks, a carrier at the end of each track, means mounting each carrier for adjustment laterally of the tracks to accommodate the front wheels, gripping means mounted on each carrier for gripping a wheel and means for adjusting tilting each gripping means about a horizontal axis transverse to the tracks.

3. An alignment device for the front wheels of an automobile comprising spaced parallel tracks, a carrier at the end of each track, means mounting each carrier for adjustment laterally of the tracks to accommodate the front wheels, gripping means mounted on each carrier for gripping a wheel, and means mounting each gripping means for tilting movement about a horizontal axis transverse to the tracks and for movement laterally of the tracks.

4. An apparatus for gripping and tilting a wheel comprising a support, a plate mounted on the support, guide means for guiding the plate for movement along a given path on the support, a base mounted for tilting movement on the plate, means for gripping a wheel mounted on the base, means for adjustably tilting the base, and means for adjustably moving the plate relative to the support.

5. A method for adjusting the caster of a vehicle wheel having an adjustable caster mounting means comprising the steps of first firmly holding the wheel in a first position, then releasing the caster mounting means to allow free movement of the wheel into the desired caster position, then moving the wheel into said desired position, and finally securing the adjusting means to maintain the wheel in said position.

6. A method for adjusting the camber of a vehicle wheel having an adjustable camber mounting means comprising the steps of first firmly holding the wheel by a holding means in a first position, then releasing the camber mounting means to allow free movement of the wheel into the desired camber position, then moving the wheel by said holding means into said desired position, and finally securing the adjusting means to maintain the wheel in said position.

7. A method for aligning a vehicle wheel having caster and camber adjusting means for mounting the wheel to roll in a desired plane with respect to the vehicle comprising the steps of first firmly holding the wheel by a holding means, then releasing the caster and camber adjusting means for said wheel to allow free movement of the wheel, then moving the wheel by said holding means into the final caster and camber position, and finally securing the adjusting means while the wheel is so held to maintain the wheel in said position.

8. A method for aligning a vehicle wheel having caster and camber adjusting means for mounting the wheel to roll in a desired plane with respect to the vehicle comprising the steps of first releasing the caster and camber adjusting means for said wheel to allow free movement of the wheel, then moving the wheel into the final caster and camber position, holding the wheel in said position, and finally securing the adjusting means while the wheel is so held to maintain the wheel in said position.

(References on following page)

References Cited

UNITED STATES PATENTS

| | | | |
|---|---|---|---|
| 753,149 | 2/1904 | Lankford | 33—69 |
| 1,368,085 | 2/1921 | Womack | 269—75 |
| 1,392,130 | 9/1921 | Engstrom | 269—71 |
| 1,702,794 | 2/1929 | Nichols | 33—203.12 X |
| 2,045,109 | 6/1936 | Smith | 33—203.12 |
| 2,050,721 | 8/1936 | McCullough | 33—203.18 |
| 2,133,827 | 10/1938 | Miller | 33—203.12 |
| 2,417,779 | 3/1947 | Pancake et al. | 29—404 |
| 2,738,589 | 3/1956 | Jacob | 33—180 |

LEONARD FORMAN, *Primary Examiner.*

ISAAC LISANN, *Examiner.*

WILLIAM D. MARTIN, JR., *Assistant Examiner.*